(12) United States Patent
Wynn et al.

(10) Patent No.: US 7,937,452 B2
(45) Date of Patent: May 3, 2011

(54) FRAMEWORK FOR RENDERING PLUG-INS IN REMOTE ACCESS SERVICES

(75) Inventors: TongLu Wynn, Redmond, WA (US); Nadim Y. Abdo, Bellevue, WA (US); Oreste Dorin Ungureanu, Duvall, WA (US); Ivan Brugiolo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 240 days.

(21) Appl. No.: 12/033,856

(22) Filed: Feb. 19, 2008

(65) Prior Publication Data

US 2009/0210482 A1 Aug. 20, 2009

(51) Int. Cl.
*G06F 15/16* (2006.01)
*G06F 15/173* (2006.01)

(52) U.S. Cl. .................. 709/219; 709/217; 709/227

(58) Field of Classification Search .............. 709/200, 709/201–253
See application file for complete search history.

(56) References Cited

U.S. PATENT DOCUMENTS

| | | | |
|---|---|---|---|
| 2003/0084169 A1* | 5/2003 | Zhu et al. ............... | 709/229 |
| 2004/0250130 A1 | 12/2004 | Billharz et al. | |
| 2005/0088447 A1 | 4/2005 | Hanggie et al. | |
| 2005/0091571 A1 | 4/2005 | Leichtling | |
| 2005/0125560 A1 | 6/2005 | Brockway et al. | |
| 2006/0069797 A1 | 3/2006 | Abdo et al. | |
| 2006/0195895 A1 | 8/2006 | Ben-Shachar et al. | |
| 2006/0248180 A1 | 11/2006 | Bernardi et al. | |
| 2006/0274072 A1* | 12/2006 | Bhatia ..................... | 345/501 |
| 2007/0079244 A1 | 4/2007 | Brugiolo | |
| 2007/0097130 A1 | 5/2007 | Margulis | |
| 2007/0124474 A1 | 5/2007 | Margulis | |

OTHER PUBLICATIONS

"pcAnywhere 12.0", at <<http://www.pcmag.com/article2/0, 1895, 1965217,00.asp>>, Ziff Davis Publishing Holdings Inc., 2007, pp. 5.
"rdesktop; A Remote Desktop Protocol Client for Accessing Windows NT Terminal Server", at <<http://www.rdesktop.org/>>, SourceForge, pp. 3.
VedBrat, "Mike remotes the DWM from a Virtual Machine", at <<http://blogs.msdn.com/kamvedbrat/archive/2006/02/27/539744.aspx>>, 2006, pp. 3.

* cited by examiner

*Primary Examiner* — Hussein A Elchanti
(74) *Attorney, Agent, or Firm* — Lee & Hayes, PLLC

(57) ABSTRACT

A framework for and hosting rendering plug-ins in remote access services is disclosed. The framework provides an interface between the core components of the remote access system and the rendering plug-ins. The framework utilizes public APIs to provide the interface between the core components and the rendering plug-ins. Using the APIs, the framework can allow various existing and new rendering plug-ins to interact with the core components of the remote access system, thereby making an extensible system that can support a variety of rendering plug-ins.

18 Claims, 6 Drawing Sheets

FRAMEWORK FOR RENDERING PLUG-INS IN REMOTE ACCESS SERVICES

BACKGROUND

Remote access services can allow a user to access applications and data stored on a remote computing device over a network. Examples of remote access services can be Terminal Services™ (TS), which is a component of Microsoft® Windows® provided by the Microsoft® Corporation headquartered at Redmond, Wash. In addition, a remote access service can allow users to access one or more applications through a desktop associated with the remote computing device, such as a server. The desktop can be rendered on the client device, by modules such as a rendering module, based on rendering information sent by the remote computing device. The rendering information creates a surface on the client device and allows the rendering of the desktop within the surface.

Remote access services can allow exchange of information between the remote computing device and one or more client devices logged onto the remote computing device. Such information may include rendering information from the remote computing device for generating a surface on the client end. The surface can be understood to be a logical memory store or space onto which the graphical output can be displayed at the client devices.

Transmitting the rendering information from the remote computing device to the client device can be achieved by remoting at a primitive command level. This may involve the remote computing device sending primitive command level drawing commands to the client device. Based on the primitive command level drawing commands a graphical result can be generated at the remote client device. One or more rendering plug-ins at the server can send the primitive commands, and the rendering plug-ins at the client devices can render surfaces in accordance with the primitive commands.

New rendering extensions that support graphics interfaces such as GDI, WPF, and so on are being developed. The number of such extensions is expected to grow significantly, as new graphical interfaces become available. In existing TS scenarios, there is no uniform and clearly defined model to support new extensions. The complexity and cost of supporting increasing number and types of extensions would therefore increase in the near future.

SUMMARY

This summary is provided to introduce concepts relating to a framework for rendering plug-ins in remote access scenarios, which are further described below in the detailed description. This summary is not intended to identify essential features of the claimed subject matter, nor is it intended for use in determining the scope of the claimed subject matter.

In an embodiment, a framework provides an interface between core components of a remote access system that includes a server and client, and the rendering plug-ins on the server and the client. The framework can implement application program interfaces to provide the interface between the core components and the rendering plug-ins.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
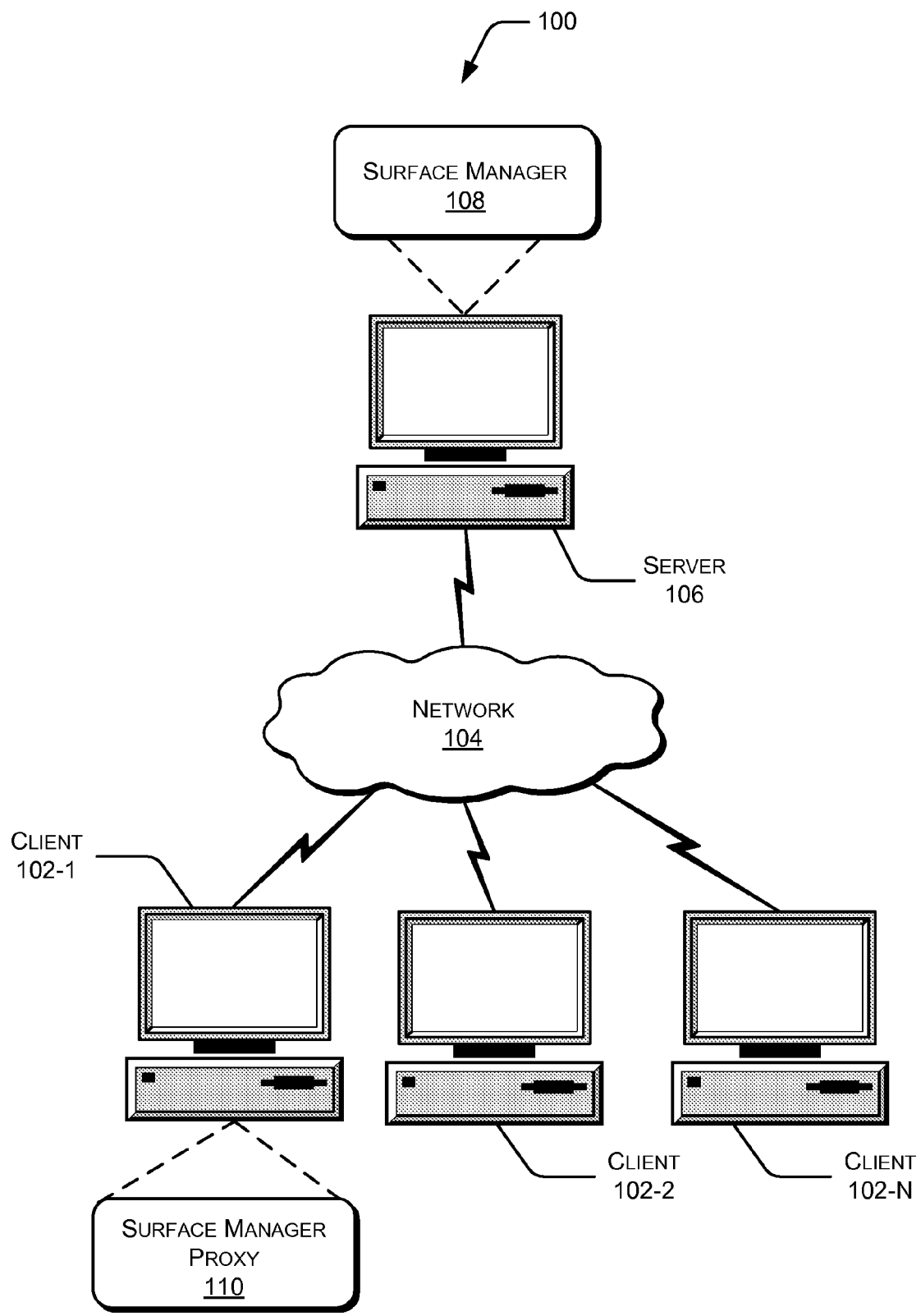
FIG. 1 is a block diagram illustrating an exemplary architecture based on a framework for rendering plug-ins in remote access services.

Systems and methods for implementing a framework to support rendering plug-ins in remote access services are described. The framework to support rendering plug-ins in remote access service can be implemented in a variety of remote access services available on a host of operating systems. The following systems and methods are described with reference to a Microsoft® Windows® operating system Terminal Services™ (TS) system; however, it will be appreciated that the disclosed framework can be implemented in various other remoting based systems.

Remoting based systems such as those based on a TS system allow a computing device, for example, a server device or server, to host applications for remote access by one or more remote client devices. Remoting of applications involves generating an output, associated with the application running on the server device, at the client devices. Therefore, at the client device or client, the generated output simulates the working environment of the server. Users associated with the client devices can utilize the applications hosted on the server device as if they were directly working on the server device.

The output can be generated at the client device based on rendering information sent by the server device. The rendering information can be remoted to the client through rendering extensions, interchangeably referred to as rendering plug-ins. The rendering extensions can be of a variety of types. Additionally, many new extensions may further be developed. It is to be appreciated that the new extensions should be consistent with present remoting based systems, allowing ease in maintenance and extensible support.

To this end, an extensible framework is described for supporting different types of rendering plug-ins in multiple remoting scenarios. Remoting based systems, such as those based on TS, can support different scenarios, namely direct mode and composition mode. Examples of direct mode can be remoting desktop environment without desktop composition, and applications remoting techniques such as applications based on RAIL (i.e. Remote Application Integrated Locally). Example of composition mode can be remoting desktop environment with desktop composition. In order for an application at the TS server device to function properly in each of the scenarios, a rendering plug-in should be able to transfer surface information to the TS core components such as surface consumers on both the server device and the client device.

To this end, the disclosed framework can provide a consistent way for the surface consumers, such as desktop windows manager or DWM, window manager and so on, to consume surfaces of various types (DX, GDI) rendered by graphics applications. A Surface can be a logical space or memory on which the rendering plug-ins produce their graphical result. The rendering plug-ins can remote graphical commands at primitive command level and the rendering plug-ins at the client can use the graphical commands to produce a graphical result to be consumed by the client consumer.

In composition mode, to achieve primitive level remoting the server can remote the DWM composition tree, the redirected surface descriptions for which primitive level redirection is supported, and graphical command streams used to rasterize the redirected surfaces. In direct mode, no composition tree needs to be remoted.

For example, in the composition mode, when a surface consumer is running on a system, graphics applications can produce surfaces through rendering while the surface consumer consumes them to compose the desktop. Different graphics applications can use different rendering extensions to render into surfaces that are then combined by the surface consumer, such as DWM to produce the desktop. System redirection state can describe the relationship between the surface consumer, the graphics applications, and their redirected surfaces. For example, in VISTA® operating system, specialized codes can be distributed in various parts of the system (DWM, win32k, dxgkrnl) to implement redirection functions. In DWM, specialized codes can handle redirection for all supported surfaces.

In addition, the framework can introduce logical surface abstraction that encapsulates the specialized implementations for the surfaces currently supported in the system. The DWM would then redirect system surfaces by use of redirection APIs written to these logical surfaces. The logical surface would encapsulate various types of surfaces (GDI or DX) and translate the generic surface redirection API's to the various specialized implementations. New surfaces can be added to the system (DX 11, 12) without having to changes core components due to the encapsulation.

Presently no standard interface between various types of rendering plug-in and the TS core components exists, resulting in poor extensibility and inconsistency in implementation of rendering plug-ins in a TS system. For example, in the composition mode, a new rendering plug-in cannot be enabled without modifying system core components. Likewise, limitations may exist in implementing a new rendering plug-in for other scenarios being implemented in systems based on remote access.

The framework aims at abstracting and isolating the core functionality associated with the remoting based systems from the rendering extensions. It may be appreciated that the core functionalities associated with remoting based systems can be realized through a variety of core components. In one implementation, the framework may be implemented through one or more Application Programming Interfaces (APIs). The rendering plug-in can remote primitive commands and generate surface data on the remote client and the core components of the remoting based systems can provide a render target for rendering based on the surface data produced by the rendering plug-in. The APIs can provide an interface for the rendering plug-ins to communicate with the core components.

Systems based on the framework for supporting different types of rendering plug-ins in multiple remoting scenarios can include one or more agents or surface managers. The surface managers can include public APIs that allow the rendering plug-ins to interact with the core components.

An Exemplary System

FIG. 1 illustrates an exemplary system architecture 100 based on a framework for rendering plug-ins in remote access services. The system architecture 100 includes remote client computing devices 102-1, 102-2, . . . , 102-N, collectively referred to as client 102, associated through a network 104 with one or more terminal services enabled server computing device(s) or server 106. The client 102 may be any of a variety of conventional computing devices, including, for example, a server, a desktop PC, a notebook or portable computer, a workstation, a mainframe computer, a mobile computing device, an Internet appliance, a kiosk, etc.

The network 104 may be a wireless or a wired network, or a combination thereof. The network 104 can be a collection of individual networks, interconnected with each other and functioning as a single large network (e.g., the Internet or an intranet). Examples of such individual networks include, but are not limited to, Local Area Networks (LANs), Wide Area Networks (WANs), and Metropolitan Area Networks (MANs).

In the present implementation, the server 106 can be accessed by the client 102 through the network 104 using one or more protocols, for example a transmission control protocol running over an internet protocol (TCP/IP). In addition, the remote desktop protocol (RDP) can be used to send commands to the client 102. The remote desktop protocol can open dynamic virtual channels to send commands to the client 102.

The server 106 may be any of a variety of servers that use one or more rendering extensions, such as server rendering plug-ins, to remote primitive level drawing commands to the client 102 for generating a surface at the client 102. The server rendering plug-in can be a module that uses GDI, WPF, and DirectX® and so on, to send primitive level drawing commands to one or more rendering plug-ins at the client 102.

The server 106 includes a surface manager 108 acting as a middle tier that connects various rendering plug-ins with core components, such as surface consumers. Surface consumers can utilize the content of surfaces, provided by the rendering plug-ins, to generate render targets at the client. The render target can be a logical memory allocated for a surface. For example, the render target can be a window. The surface manager can bind the rendering plug-ins and surface consumers such that the surface consumers can access the surface generated by the rendering plug-ins, and render the surfaces on the render targets. In one implementation, the generated surface can be associated with an identifier.

The client 102 can include a surface manager proxy 110. The surface manager proxy 110 can be a proxy of the surface manager 108 on the server 106. In one implementation, the surface manager proxy 110 can be identical to the surface manager 108. The surface manager proxy 110 aids the communication between the client rendering plug-in and the client surface consumer.

The surface manager 108 and the surface manager proxy 110 can provide logical connections between the rendering plug-ins and the TS core components at the server 106 and the client 102 respectively. Therefore, new rendering modules when created would be able to communicate with the TS core components utilizing the surface manager 108 and surface manager proxy 110. The working of the surface manager 108 and the surface manager proxy 110 are further described in detail below in reference to FIGS. 2-4.

Figure 2:
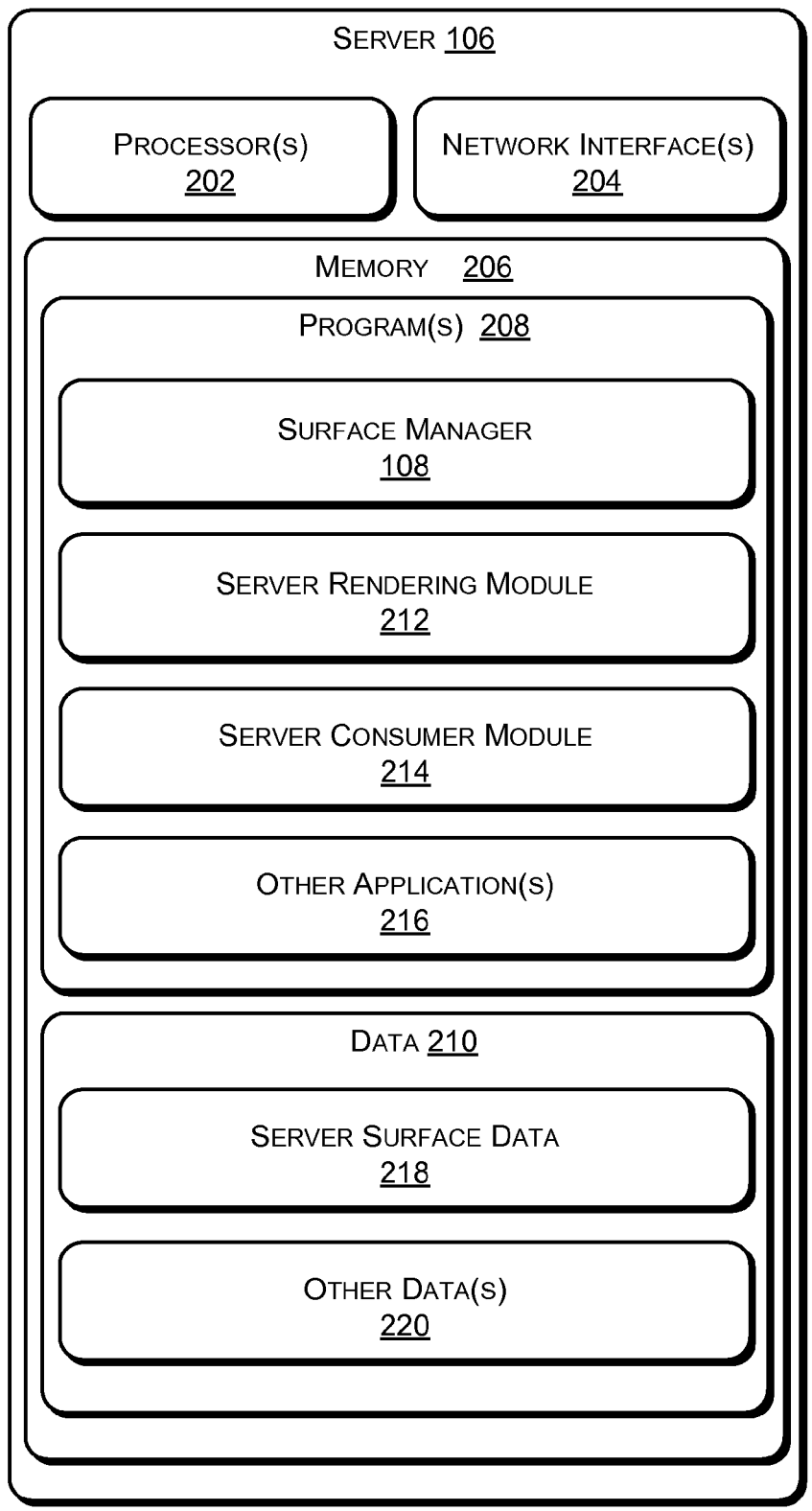
FIG. 2 is a block diagram illustrating an exemplary server computing device implementing a framework for rendering plug-ins in remote access services.

FIG. 2 illustrates exemplary components of the server 106 based on the framework for supporting rendering plug-ins in remote access services. The server 106 includes one or more processor(s) 202, one or more network interfaces 204, and a memory 206. Processor(s) 202 can include, for example, microprocessors, microcomputers, microcontrollers, digital signal processors, central processing units, state machines, logic circuitries, and/or any devices that manipulate signals based on operational instructions. Among other capabilities, processor(s) 202 can be configured to fetch and execute computer-readable instructions stored in memory 206.

The network interface(s) 204 facilitates communication between the server 106 and the client 102. Furthermore, the network interface(s) 204 may include one or more ports for connecting the client 102 to the server 106. The network interface(s) 204 can facilitate communications within a wide variety of networks, such as the network 104, and protocol types, including wired networks (e.g. LAN, cable, etc.) and wireless networks (e.g. WLAN, cellular, satellite, etc.). The server 106 receives an input from a user or the client 102 via the ports connected through the network interface(s) 204 and the TS server 106 can send back the relevant information to create surface data on the client 102 via the network interface (s) 204.

The memory 206 can include any computer-readable medium known in the art including, for example, volatile memory (e.g., ram) and/or non-volatile memory (e.g., flash, etc.).

As illustrated in FIG. 2, the memory 206 can also include program(s) 208 and data 210. The program(s) 208 can include the surface manager 108, a server rendering module 212, a server consumer module 214, and other application(s) 216. The other application(s) 216 include one or more programs that may supplement applications on the server 106. The server rendering module 212 can be a plug-in component of a graphics stack on the server.

The data 210 can include server surface data 218, and other data 220, such as data associated with a general functioning of the program(s) 208.

Figure 3:
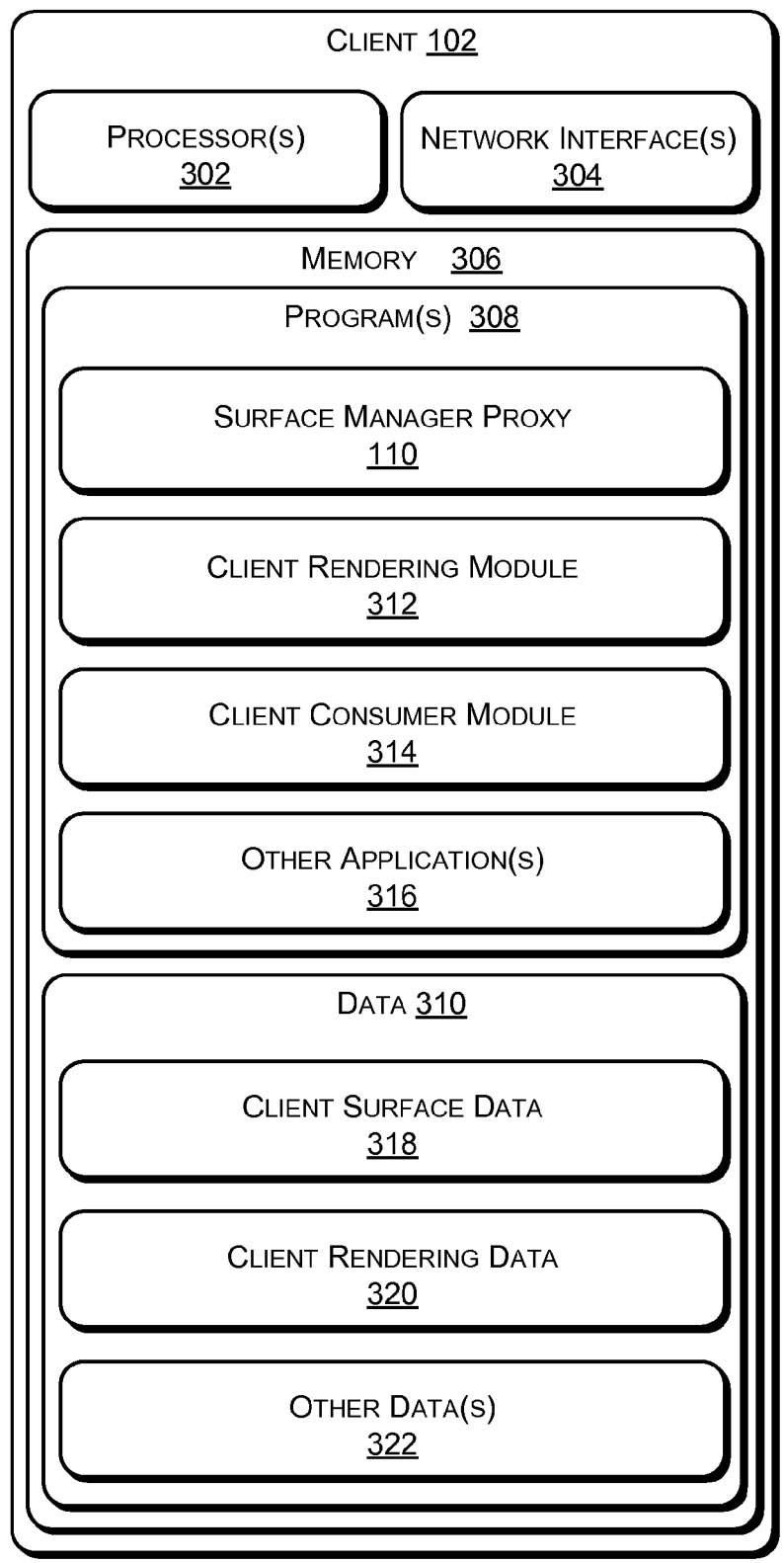
FIG. 3 is a block diagram illustrating an exemplary client computing device implementing a framework for rendering plug-ins in remote access services.

FIG. 3 illustrates exemplary components of the client 102 based on the framework to support rendering plug-ins in remote access services can be implemented. The client 102 includes one or more processor(s) 302, one or more network interface(s) 304, and a memory 306. Processor(s) 302 can include, for example, microprocessors, microcomputers, microcontrollers, digital signal processors, central processing units, state machines, logic circuitries, and/or any devices that manipulate signals based on operational instructions. Among other capabilities, processor(s) 302 can be configured to fetch and execute computer-readable instructions stored in memory 306.

The network interface(s) 304 facilitates communication between the terminal services enabled server 106 and the remote client 102. Furthermore, the network interface(s) 304 may include one or more ports for connecting the client 102 to the server 106. The network interface(s) 304 can facilitate communications within a wide variety of networks, such as the network 104, and protocol types, including wired networks (e.g. LAN, cable, etc.) and wireless networks (e.g. WLAN, cellular, satellite, etc.). The server 106 receives an input from a user or the client 102 via the ports connected through the network interface(s) 304 and the TS server device 106 can send back the relevant information to create a surface on the client 102 via the network interface(s) 304.

Memory 306 can include any computer-readable medium known in the art including, for example, volatile memory (e.g., RAM) and/or non-volatile memory (e.g., flash, etc.).

As illustrated in FIG. 3, the memory 306 can include program(s) 308 and data 310. Program(s) 308 can include the surface manager proxy 110, a client rendering module 312, a client consumer module 314, and other application(s) 316. The other application(s) 216 include one or more programs that may supplement applications on the client 102.

Data 310 can include client surface data 318, client rendering data 320, and other data 322, such as data associated with a general functioning of one or more program(s) 308.

Figure 4:
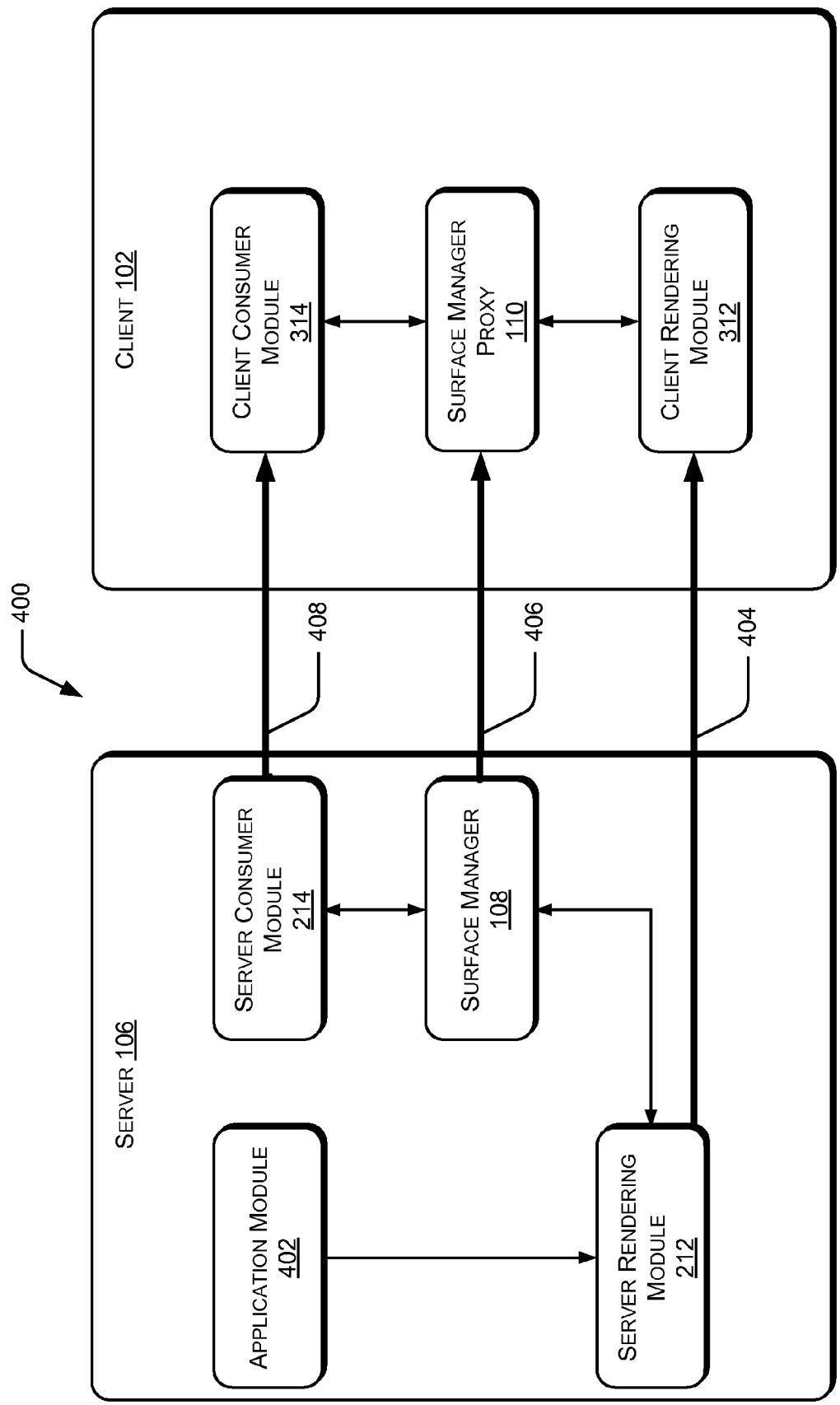
FIG. 4 is a block diagram illustrating an exemplary framework that supports rendering plug-ins in remote access services.

FIG. 4 illustrates an exemplary framework 400 depicting the interaction of the components of the server 106 and the client 102, for supporting rendering plug-ins in remote access services.

The application module 402 can be any application hosted by the server 106, which when executed, generates a graphical output. Typically, in remoting scenarios, the graphical output is remoted to the client devices such as client 102. The execution of the application module 402 at the server 106 may result in a change in the graphical output being generated at the client 102.

In order to generate the graphical output at the client 102, the server rendering module 212 can send primitive drawing commands 404 to the client rendering module 212. In one implementation, the server rendering module 212 and the client rendering module 312 can be any existing rendering plug-in or a new rendering plug-in. The server rendering module 212 can utilize standard graphical interfaces and protocols to send primitive drawing commands to the client rendering module 312. The client rendering module 312 can utilize the same graphical interfaces and protocols to receive the primitive drawing commands 404 to generate surface data that can be utilized by the client core components to render a surface at a pre-specified render target. In one implementation, the surface data can be stored in the client rendering data 320.

In one implementation, the primitive drawing commands 404 can be commands targeted for each application to a specific render target and surface data that occupies the render target. The primitive drawing commands 404 can be commands such as Graphic Device Interface (GDI) drawings commands, Windows Presentation Foundation (WPF) drawing commands, or such, generated by the server rendering module 212.

In one implementation, the server rendering module 212 can open a typed Remote Desktop Protocol (RDP) pass through pipe and that can allow the server rendering module 212 to emit primitive drawing commands 404 into this pipe. For example, the RDP pass through pipe can be a dynamic virtual channel, which is a network connection.

The server consumer module 214 can receive surface information 406 from the server rendering module 212 via the surface manager 108 and it can send the surface information 406 regarding the surface and the render target to the client consumer module 314 via the surface manager proxy 110. The client consumer module 314 can receive the surface information 406 and render the surface generated by the client rendering module 312 at the pre-specified render target.

In the case of composition mode, the client consumer module 314 can be a DWM plug-in (i.e., a DWM process) that can host remote composition tree of the server consumer module 214. In the case of direct mode, the client consumer module 314 can be a RAIL window manager that manages the RAIL window proxies and child windows on the TS client 102. In case of remote desktop, the client consumer module 314 can be a child window manager that manages the child windows at the TS client 102 output window.

The surface manager 108 can provide an interface between the server rendering module 212 and the server consumer module 214. The surface manager 108 can allow the server rendering module 212 to send surface information to the surface manager 218 and allow the server rendering module 212 to communicate with the server consumer module 214. The surface manager can allow the server consumer module 214 to receive surface information from the server rendering module 212.

In one implementation, the server rendering module 212 can call the surface manager 108 for two primary functions. The first function can be to create a logical surface or window. For example, the first function may be termed "AllocateSurfaceHandle", which generates a unique identifier for a surface to be generated at the client 102. In one implementation, the surface manager 108 can store the surface identifier in the server surface data 218. The unique identifier can be sent to the client rendering module 312 to allocate a real surface to receive the upcoming primitive drawing commands 404. In addition, the unique identifier generated can be used as a key to associate the surface to the surface manager 108.

The second function of the surface manager 108 may be to track the surface or specify the association between the surface that would be generated by the client rendering module 312 and the render target. Association information 408 can be sent to the client consumer module 314 via the surface manager proxy 110 to allocate a render target for the surface. In addition, association information 408 can trigger the association of the server consumer module 214 and the surface manager 108.

The association information 408 can include information such as an indication of which render target a surface is intended for. The association information 408 can include structural redirection information to correctly create surfaces at the user interface. Examples of the association information 408 include, but are not limited to, a composition tree, window mapping information specifying the positioning of windows, the extent of overlap of a plurality of windows, border transparency, border color, border texture, button appearances, shading, light perspectives, object rotation information, and so on.

In order to provide the interfaces for the server rendering module 212 and the server consumer module 214, the surface manager 108 can have two sets of API's. One set of the APIs can be for the server rendering module 212 and the other set can be for the server consumer module 214. The rendering module API of the surface manager 108 can allow the server rendering module 212 to create a surface identifier and associate the surface identifier with a render target. The consumer module API of the surface manager 108 can allow the server consumer module 214 to register with the surface manager 108 to receive notifications regarding changes to the surfaces.

On the client side of the framework, the surface manager proxy 110 provides an interface for the client rendering module 312 and the client consumer module 314. The surface manager proxy 110 is a proxy of the surface manager 108, present at the server 106. In one implementation, the surface manager proxy 110 can be identical to the surface manager 108. The surface manager proxy 110 can be based on a collection of APIs that can provide the interface between the TS core components of the client 102, such as the client consumer module 314 and components that render graphics at the client 102, such as the client rendering module 312.

The surface manager proxy 110 can allow the rendering module 312 to transfer the surface data to the client consumer module 314. In addition, the surface manager proxy 110 can allow the client consumer module 314 to request for surface data and dirty regions from the client rendering module 312. The dirty regions can be the invalid part of the surface or the part of the surface that has changed. Dirty region data can be discarded, and new surface data for that region may have to be generated.

To this end, the surface manager proxy 110 includes APIs. One of the APIs provides an interface that can allow the client rendering module 312 to register a surface with the surface manager proxy 110 and to notify the surface manager proxy 110 of any changes in the surface. Another API of the surface manager proxy 110 can provide an interface that can allow the client consumer module 314 to register with the surface manager proxy 110 to receive notifications regarding any changes in the surface produced by the client rendering module 312. In addition, this interface can allow the client consumer module 314 to retrieve surface data and dirty regions of the surface.

In addition, the surface manager proxy 110 can include interfaces that can allow the client consumer module 314 to access the surface data and accumulated dirty region at the client rendering module 312. The client rendering module 312 manages the access to these surfaces by keeping a list of surfaces indexed by the Surface identifier on the server 106. Creation and deletion of the surface are controlled by primitive drawing commands 404 from the server rendering module 212.

At runtime, the server rendering module 212 sends a notification (e.g., "Allocate(hSurface)") to the surface manager 108 to allocate an identifier to the surface to be rendered. Once the identifier has been allocated, the server rendering module 212 can send surface information 406, such as a command (e.g., "CreateRenderTarget(hSurface)") to the client rendering module 312 via the surface manager 108 in order to create a render target and a local surface. On creation of the local surface, the client rendering module 312 can send an AddSurface command to the surface manager proxy 110 via an API to add the surface in the list of surfaces maintained by the surface manager proxy 110. In one implementation, the surface manager proxy 110 can store the surface identifier in the client surface data 318.

In addition, the server rendering module 212 can send a command (e.g., "Associate(hSurface, hWnd)") to the surface manager 108 to associate a render target with the surface. The surface manager 108 can make the association and pass the association information 408 forward to the server consumer module 214. At the client 102, the client consumer module 314 receives association information 408, via the surface manager proxy 110. The client consumer module 314 can utilize the association information 408 to associate a window node or proxy window with the surface that the client consumer module 314 will receive from the client rendering module 312. Once the client consumer module 314 receives the association information 408, it can send a command (e.g., "SurfaceAttach(hSurface)") to the surface manager proxy 110, in order to register with the surface manager proxy 110 to receive any notifications regarding the surface associated to the surface identifier (e.g., "Surface", or render target).

The server rendering module 212 can send rendering commands such as primitive drawing commands 404 to the client rendering module 312. The client rendering module 312 can receive the primitive drawing commands 404 and generate surface data. The local surface associated with the surface identifier (e.g., "hSurface") can be populated with the surface data generated by the server rendering module 212. Once the surface data has been generated at the client 102, the client consumer module 314 can receive a notification. Client consumer module 314 can then request the surface manager proxy 110 to forward the surface data and the dirty regions. The client consumer module 314 can receive this surface data, and along with the association information 408 it had received from the server consumer module 214, render the surface on to the allocated render target at the user interface.

Framework 400 can be implemented for different types of rendering plug-ins in various TS scenarios. The framework 400 described the interface that a rendering plug-in uses to make its surface data accessible to the client consumer module 314. The client consumer module 314 is a different TS core component in each of the TS scenarios. The implementation of the framework 400 in the direct mode and the composition mode is described below in detail.

Composition Mode

In this scenario, the TS server consumer module 214 and the client consumer module 314 can be a desktop window manager (DWM) compositor. The DWM compositor maintains a "composition tree" which keeps track of window nodes that represent the windows and their properties in the system. Each window node can have one or more resources that can be redirection surfaces. The DWM compositor can compose the desktop scene by using the redirection surfaces attached to its "composition tree".

The server consumer module 214 can remote association information, such as a DWM composition tree to the TS client 102 and the composition tree can be hosted by the client consumer module 314, For example, the "composition tree" can be remoted to the client 102 using MIL protocol. In composition mode, the surface manager proxy 110 is required for the client rendering module 312 to bind to the redirection surface that can be consumed by the DWM compositor. For the framework to function properly, a few modules have to be added at the client 102 in order to render the surfaces.

Remoting GDI surface in composition mode uses most of the frame work described in FIG. 4 except the dirty region notification. The dirty region notification can be implemented as a special command such as "DirtySprite", which can be replaced with the surface manager APIs described in FIG. 4. Minimal changes may be required in the client rendering module 312 to introduce the framework 400 in the remote desktop with desktop composition environment.

Remoting of WPF applications is currently handled within Milcore, which is an unmanaged composition engine part of the DWM composition module. A WPF hosting rendering plug-in can be introduced in the TS client 102. The WPF hosting rendering plug-in can create and own the surface composed from the remoted composition tree of the WPF application on the server 106 and the surface of its leaf nodes.

Remoting of DirectX applications is not supported by composition mode at present. To add the support in the framework 400, the DirectX client rendering module 312 can be added to create surfaces and notify the surface manager proxy 110 API of the changes in the surface.

Direct Mode

In direct mode, such as RAIL and Remote Desktop without desktop composition, the render target can be a window. The rendering plug-ins can directly produce their graphical result to a proxy window created on the client 102. The surface manager 108 can be relatively simpler in direct mode as it does not need to manage any redirection surfaces and the consumer module does not require a surface compositor. Enabling various rendering plug-ins in direct mode, using the same framework 400 and surface manager APIs may be implemented. For example, in RAIL, the server consumer module 214 and the client consumer module 314 can be the RAIL window manager. The RAIL window manager can manage RAIL windows, which are top level windows. The surface manager proxy 110 can create and manage child windows that can be the render target of RAIL windows. A RAIL surface manager 108 may be added to the server 106 to handle the association information on the server 106. Therefore, the surface manager 108 can be added to the TS RAIL server 106. The server consumer module 214 can track render target windows in the server 106 and remote them to the client consumer module 314 on the RAIL client 102.

In addition, the surface manager proxy 110 can be added to the RAIL client 102 to manage the render target windows. The client consumer module 314, such as the window manger can receive rendering target window tracking information and create proxy windows and child windows on the client 102

In remote desktop without desktop composition, the surface manager 108 and the surface manager proxy 110 can be added to implement the framework 400. The server rendering module 212 and client rendering module 312 may have to provide support for window tracking and synchronization between the client 102 and the server 106. On the server-side, the surface manager 108 can track the render target windows such that the surface manager proxy 110 on the client 102 can create corresponding proxy windows.

The surface manager 108 could have three main functions. First, when the server rendering module 212 asks a surface identifier to be allocated, the surface manager 108 can return a NULL value. Second, the surface manager 108 can track the window to be rendered at the client 102. Third, the surface manager 108 can decide when to stop tracking the window, in case the window has been terminated due to some user input.

The client rendering module 312 can call the API of the surface manager proxy 110 at the client 102 and the surface manager proxy 110 can make decisions regarding whether the client rendering module 312 should provide a surface for consumption or render to a window directly.

Exemplary Method(s)

Figure 5:
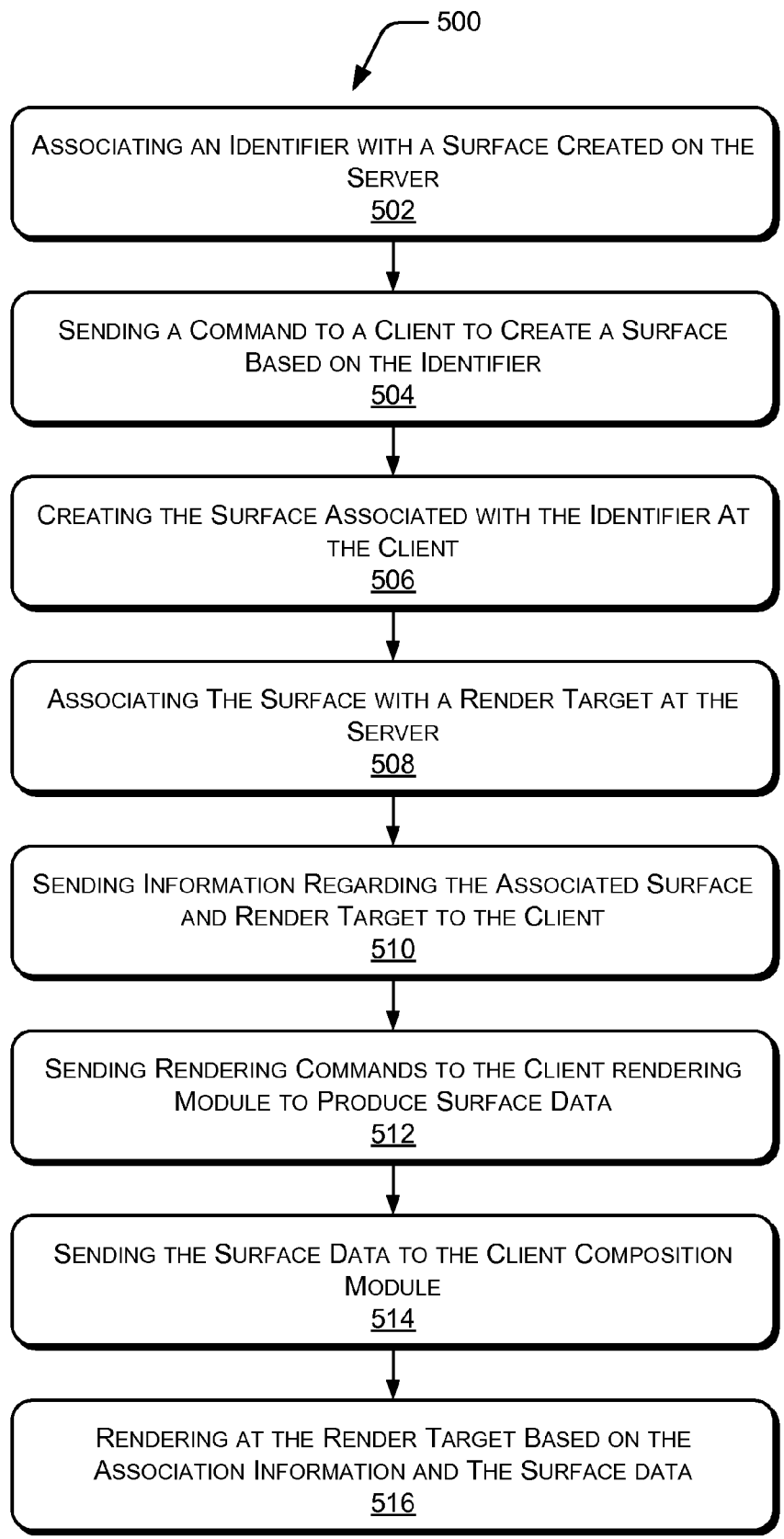
FIG. 5 is a flowchart illustrating an exemplary method that utilizes the framework for rendering plug-ins in remote access services.

FIG. 5 illustrates an exemplary method 500 for implementing a framework for rendering plug-ins in remote access services. The method 500 is described with reference to FIGS. 1-4. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or a combination thereof, without departing from the scope of the invention.

At block 502, an identifier can be associated with a surface created at the server. In one implementation, the server rendering module 212 can call the surface manager 108 through the rendering module API of the surface manager 108 and request the surface manager 108 to allocate the identifier (e.g., "hSurface") to the surface. For example, the server rendering module 212 can send a command (e.g., "AllocateSurfaceHandle") to the surface manager 108. The surface manager 108 can allocate the identifier (e.g., "hSurface") and store this value in the server surface data 218.

At block 504, a command can be sent to the client 102 to create a surface based on the identifier associated with the surface. In one implementation, the surface manager 108 can send the command to the surface manager proxy 110 for creating the surface in association with the surface identifier at the client 102. This command can be surface type specific, such as device independent bitmap, Dx shared surface, and so on. For example, the command can be "CreateRenderTarget (hSurface)".

At block 506, a surface is created at the client 102 associated with the surface identifier allocated at the server 106. The surface created at the client 102 can be associated with the identifier provided by the surface manager 108. In one implementation, the surface manager proxy 110 can create the surface and add the surface identifier to the surface list maintained at the surface manager proxy 110. The surface manager proxy 110 can add the identifier (e.g., "hSurface") to the list of surface identifiers maintained or active at the user interface. In one implementation, the surface manager proxy 110 can store the surface identifier in the client surface data 318. For example, the client rendering module 312 can send an "AddSurface" command to the surface manager proxy 110 using one of the surface manager proxy 110 API.

At block 508, the surface can be associated with a render target. In one implementation, the server rendering module 212 can send an association call (e.g., "Associate(hSurface, hWnd)") to the surface manager 108. The surface manager 108 can then associate the allocated surface identifier with a render target. The server consumer module 214 can use the association information 408. In one implementation, the association information 408 associated with the association of the surface identifier with the render target can be composition tree or window mapping information.

At block 510, the information regarding the association of the surface identifier with the render target can be sent to the client 102. The association information 408 can be sent by the sever composition module 214 to the client consumer module 314 via a network, such as the network 104. In one implementation, the association information 408 can be sent in the form of composition tree or window mapping information. The client consumer module 314 can create a proxy for the render target on the server 106 (i.e., the proxy is either a window node in the remoted DWM tree or a proxy window in direct mode).

Once the client consumer module 314 has allocated a render target, the client consumer module 314 can register with the surface manager proxy 110 to receive notifications regarding any changes in the surface associated with the identifier. In one implementation, the client consumer module 314 can send a SurfaceAttach(hSurface) command to the surface manager proxy 110 via the ITSSurfaceManagerProxyConsumer API to register with the surface manager proxy 110 to receive notifications related to the surface identifier it provided to the surface manager proxy 110.

At block 512, rendering commands can be sent to the client 102. For example, the server rendering module 212 can send the rendering commands such as primitive drawing commands 404 to the client rendering module 312. The rendering commands can be sent using any standard protocols such as GDI, WPF, DirectX and so on. The primitive drawing commands 404 can instruct the client rendering module 312 to render the surface data as per the commands.

At block 514, the surface data can be made available to the client consumer module 314. For example, the client consumer module 314 can request the surface manager proxy 110 to provide the surface data, such as GetSurfaceData(hSurface) via the ITSSurfaceManagerProxyConsumer API. The surface manager proxy 110 in turn can send a command (GetSurfaceData) to the client rendering module 312 via the ITSHostedRendererSurfaceManager API requesting the client rendering module 312 to send the surface data. The client rendering module 312 can then send the bitmap of the surface data to the client consumer module 314 via the surface manager proxy 110. In one implementation, the client rendering module 312 can store the surface data in the client rendering data 320.

In one implementation, the client consumer module 314 can request the surface manager proxy 110 to provide any dirty regions or to inform the client consumer module 314 in case any changes have occurred in the surface. For example, the client consumer module 314 can send a command GetDirtyRegion(hSurface) to the surface manager proxy 110 via the ITSSurfaceManagerProxyConsumer API. The surface manager proxy 110 can send a command to the client rendering module 312 via the ITSHostedRendererSurface to provide dirty regions and the rendering module 312 can comply and send dirty regions to the surface manager proxy.

At block 516, rendering at the render target in association with the association information 408 and the surface data can take place. In one implementation, the client consumer module 314 can render the surface data on the associated render target. The association information 408 informs the client consumer module 314 on which render target the composition module 314 is supposed to render the surface data.

In one implementation, the client consumer module 314 can render various surfaces, in case a number of applications are active. The client consumer module 314 can render the surfaces correctly using information regarding the position of render targets, the extent of overlap of windows, border transparency, border color, border texture, shading, and so on.

An Exemplary Computer Environment

Figure 6:
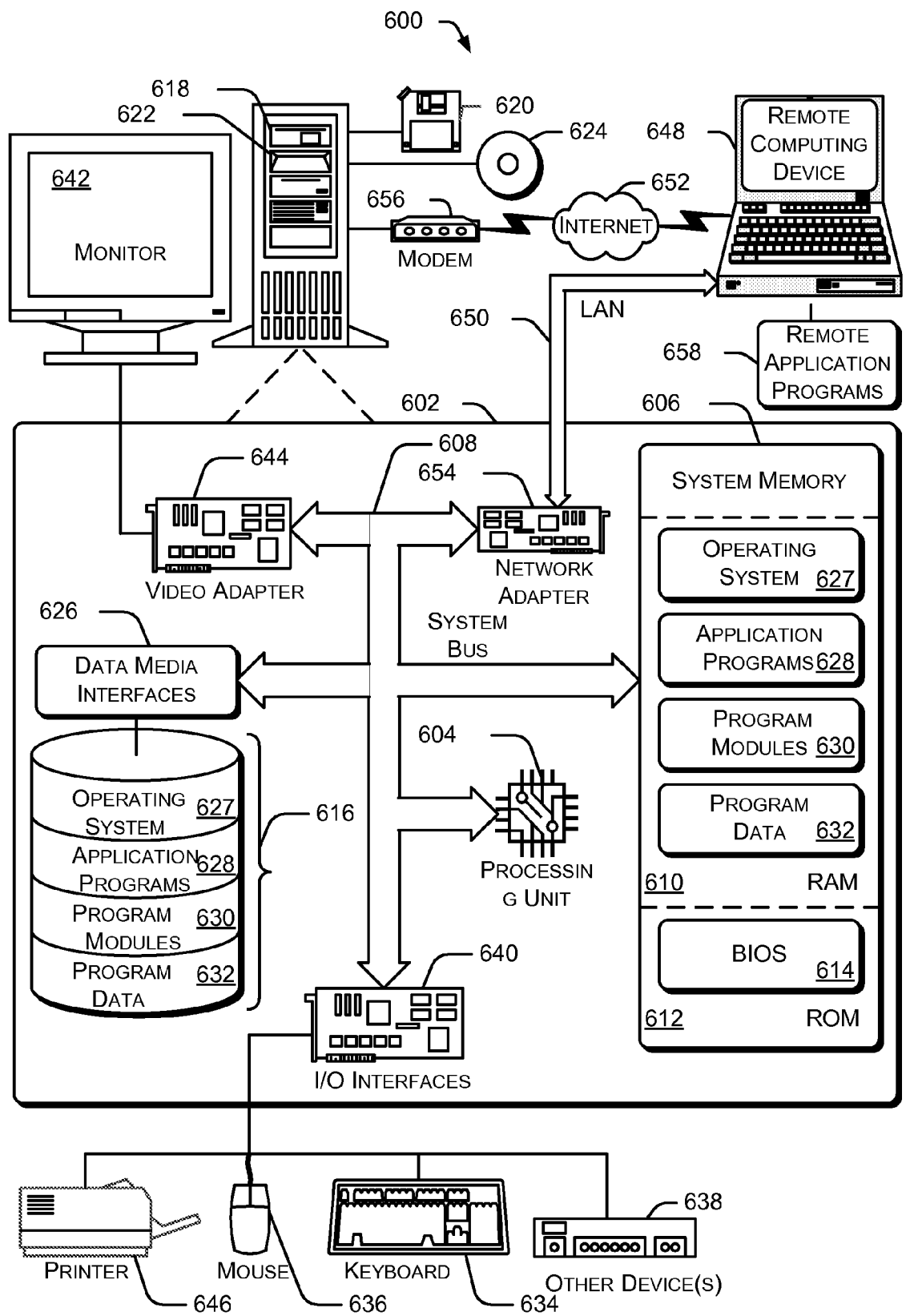
FIG. 6 is a block diagram illustrating an exemplary general computer environment that can implement the framework for rendering plug-in in remote access services.

FIG. 6 illustrates an exemplary general computer environment 600, which can be used to implement the techniques described herein, and which may be representative, in whole or in part, of elements described herein. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the example computer environment 600.

Computer environment 600 includes a general-purpose computing-based device in the form of a computer 602. Computer 602 can be, for example, a desktop computer, a handheld computer, a notebook or laptop computer, a server computer, a game console, and so on. The components of computer 602 can include, but are not limited to, one or more processors or processing units 604, a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 typically includes a variety of computer readable media. Such media can be any available media that is accessible by computer 602 and includes both volatile and non-volatile media, removable and non-removable media.

The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612 is illustrated. RAM 610 typically contains data and/or program modules that are immediately accessible to and/or presently operated on by the processing unit 604.

Computer 602 may also include other removable/non-removable, volatile/non-volatile computer storage media. By way of example, FIG. 6 illustrates a hard disk drive 616 for reading from and writing to a non-removable, non-volatile magnetic media (not shown). furthermore FIG. 6 illustrates a magnetic disk drive 618 for reading from and writing to a removable, non-volatile magnetic disk 620 (e.g., a "floppy disk"), additionally FIG. 6 illustrates an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 626. Alternately, the hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 626, one or more applications 628, other program modules 630, and program data 632. Each of such operating system 626, one or more applications 628, other program modules 630, and program data 632 (or some combination thereof) may implement all or part of the resident components that support the distributed file system.

A user can enter commands and information into computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646, which can be connected to computer 602 via the input/output interfaces 640.

Computer 602 can operate in a networked environment using logical connections to one or more remote computers, such as a remote computing-based device 648. By way of example, the remote computing-based device 648 can be a personal computer, portable computer, a server, a router, a network computer, a peer device or other common network node, and the like. The remote computing-based device 648 is illustrated as a portable computer that can include many or all of the elements and features described herein relative to computer 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote applications 658 reside on a memory device of remote computer 648. For purposes of illustration, applications and other executable program components such as the operating system are illustrated herein as discrete blocks, although it is recognized that such programs and components reside at various times in different storage components of the computing-based device 602, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternately, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

Although embodiments for implementing a framework for rendering plug-ins in remote access services have been described in language specific to structural features and/or methods, it is to be understood that the subject of the appended claims is not necessarily limited to the specific features or methods described. Rather, the specific features and methods are disclosed as exemplary implementations for implementing the framework for rendering plug-ins in remote access services.

What is claimed is:

1. A server comprising:
a memory;
one or more processors operatively coupled to the memory;
a surface manager executed on the one or more processors, wherein the surface manager generates a unique identifier for a surface and associates the surface with a render target;
a server rendering module configured to:
generate surface information,
transmit the surface information through the surface manager,
open a pass through pipe as a virtual channel to one or more client rendering modules at one or more clients, and
send primitive drawing commands to the one or more clients through the pass through pipe, the primitive drawing commands sent through the pass through pipe bypassing the surface manager; and
a server consumer module that receives the surface information through the surface manager.

2. The server of claim 1, wherein the surface manager is an interface between the server rendering module and the server consumer module.

3. The server of claim 1, wherein the surface manager includes an application program interface for the server rendering module and an application program interface for the server consumer module.

4. The server of claim 1, wherein the server rendering module is a plug-in component of a graphics stack of the server.

5. The server of claim 1, wherein the server consumer module comprises a desktop window manager (DWM) process.

6. The server of claim 1, wherein the surface manager is configured to send association information to the one or more clients to create a surface at a render target.

7. A system comprising:
a server that includes a rendering plug-in, a composition module and a surface manager, the rendering plug-in being configured to send primitive drawing commands through only a pass through pipe that bypasses the surface manager, the pass through pipe being a dynamic virtual channel;
a client that receives the primitive drawing commands from the plug-in, and surface information from the composition module; and
the surface manager generating a unique identifier for a surface, associating the surface with a render target on the client, returning a NULL value to the rendering plug-in when queried for a surface identifier to be allocated, tracking a window to be rendered at the client, and deciding when to stop tracking the window.

8. The system of claim 7, wherein the client includes a client rendering module, a client composition module, and a surface manager proxy client that receives the surface information and the primitive drawing commands from the server.

9. The system of claim 8, wherein the surface manager proxy provides an interface between the client rendering module and the client composition module.

10. The system of claim 8, wherein the surface manager proxy includes a collection of application program interfaces that connect core components to the client.

11. The system of claim 7 further comprising a network connection configured to pass the primitive drawing commands and the surface information from the server to the client.

12. The system of claim 11, wherein the network connection is further configured to send the primitive drawing commands from the server to the client via a remote desktop protocol or extensions of the remote desktop protocol.

13. The system of claim 7, wherein the system is implemented for one or more of the following: a desktop window manager, a remote application integrated locally (RAIL), and a remote desktop without desktop composition.

14. A method comprising:
generating, at a server, an identifier for a surface;
sending, by the server, a command to a client to create, at the client, the surface corresponding to the identifier;
associating, by a surface manager at the server, the identifier with a render target on the client;
sending, by the server, information regarding the associating to the client for creating an association between the identifier and the render target on the client;
opening a pass through pipe as a virtual channel to the client; and
sending primitive rendering commands from a server rendering module, implemented by at least one processor on the server, through the pass through pipe to the client, the primitive rendering commands sent through the pass through pipe bypassing the surface manager of the server.

15. The method of claim 14 further comprising receiving notifications at the client as to any surface changes based on the identifier.

16. The method of claim 14 further comprising providing any dirty regions if any changes occur for the surface.

17. The method of claim 14 further comprising sending surface data from the server to the client.

18. The method of claim 17 further comprising rendering surface data at the render target.

* * * * *

UNITED STATES PATENT AND TRADEMARK OFFICE
CERTIFICATE OF CORRECTION

| | | |
|---|---|---|
| PATENT NO. | : 7,937,452 B2 | |
| APPLICATION NO. | : 12/033856 | |
| DATED | : May 3, 2011 | |
| INVENTOR(S) | : Tong Lu Wynn et al. | |

It is certified that error appears in the above-identified patent and that said Letters Patent is hereby corrected as shown below:

Title Pg, Item (75), "Inventors" column 1, line 1, delete "TongLu Wynn" and insert
-- Tong Lu Wynn --, therefor.

Signed and Sealed this
Nineteenth Day of July, 2011

David J. Kappos
*Director of the United States Patent and Trademark Office*